United States Patent
Bennett et al.

(10) Patent No.: US 6,793,035 B2
(45) Date of Patent: Sep. 21, 2004

(54) SEMI-INDEPENDENT SWING ARM SUSPENSION SYSTEM FOR A LOW FLOOR VEHICLE

(75) Inventors: John L. Bennett, Fraser, MI (US); Mark C. Smith, Troy, MI (US); Chihping Kuan, Rochester Hills, MI (US); John K. Ma, Rochester, MI (US); William C. Sullivan, Newark, OH (US); Edward Jay Eshelman, Rochester Hills, MI (US); Dean Mark House, Pataskala, OH (US); Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 64 days.

(21) Appl. No.: 10/098,954

(22) Filed: Mar. 15, 2002

(65) Prior Publication Data

US 2003/0173137 A1 Sep. 18, 2003

(51) Int. Cl.[7] .............................................. B60K 17/00
(52) U.S. Cl. .................... 180/358; 280/124.11; 296/25; 296/178
(58) Field of Search ...................... 180/358, 21, 24.06, 180/24.07, 24.08, 24.09, 337; 280/124.11, 124.116, 124.128; 296/1.1, 25, 178, 181

(56) References Cited

U.S. PATENT DOCUMENTS

| | | | | |
|---|---|---|---|---|
| 1,872,013 | A | * | 8/1932 | Schjolin |
| 2,818,128 | A | * | 12/1957 | Uhlenhaut et al. |
| 3,976,154 | A | * | 8/1976 | Clark et al. |
| 5,433,287 | A | | 7/1995 | Szalai et al. |

* cited by examiner

Primary Examiner—Eric Culbreth
(74) Attorney, Agent, or Firm—Carlson, Gaskey & Olds

(57) ABSTRACT

A suspension system includes a swing arm which pivots about a pivot axis. A hub assembly, hub gear box and input gear box are mounted to an independently pivoting swing arm. The pivot axis is located closer to the ground than a rotational axis defined by the hub assemblies and the input gear box. A coupling extends from the input gear box to receive an input driveline from a drive source such as vehicle engine. The coupling is located proximate the pivot axis to minimize relative movement during articulation of the swing arm. An axle housing extends between the input gear box and an opposite hub gear box to support a drive shaft and serves as a torsion bar.

11 Claims, 3 Drawing Sheets

SEMI-INDEPENDENT SWING ARM SUSPENSION SYSTEM FOR A LOW FLOOR VEHICLE

BACKGROUND OF THE INVENTION

The present invention relates to a suspension system, and more particularly to a semi-independent suspension system for a mass transit vehicle which provides a significantly lower floor profile.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time if the bus stops and more comfort to passengers.

Mass transit vehicles typically have several axles which support, drive and steer the vehicle. Many such vehicles provide a rigid axle having a gear box at a longitudinal end to form an inverted portal axle configuration. Disadvantageously, this arrangement has limited ride benefits resultant from the rigid axle suspension system.

In other known embodiments, relatively more complex independent suspension systems have been available with either a single reduction carrier on relatively lighter vehicles or a double reduction system on relatively heavier vehicles. The reduction carriers are located near the axle centerline and thus take up a significant amount of packaging space. As these components are aligned near the longitudinal axis of the vehicle, the floor profile must be raised for a significant length of the vehicle. Raising the floor profile in such a manner requires the passengers to climb up to a platform above the axle, which renders that portion of the bus either inaccessible or uncomfortable.

Accordingly, it is desirable to provide a suspension system which provides ride benefits associated with independent suspension systems while maintaining a low floor profile to improve access to the vehicle.

SUMMARY OF THE INVENTION

The suspension system according to the present invention provides a first and second set of hub assemblies which are each mounted to an independent swing-arm. The swing arm pivots about a pivot axis. The pivot axis is located below (closer to the ground than) a rotational axis defined by the hub assemblies.

A hub gear box is operably connected to each hub assembly to provide torque to drive their respective set of wheels. An input gear box drives one hub gear box. The input gear box defines an input axis substantially offset from the rotational axis. A coupling extends from one input gear box to receive an input driveline from a drive source such as vehicle engine. The coupling is located proximate the pivot axis to minimize relative movement during articulation of the swing arm. That is, as the pivot axis is closer to the input gear box coupling, motion of the coupling is less than that of the hub gear box and hub assemblies during articulation.

An axle housing extends from the input gear box to an opposite hub gear box. The axle housing transmits power from the input gear box to the opposite hub gear box. The axle housing further serves as a torsion bar between the swing arms and to minimize additional support structure.

The present invention therefore provides ride benefits associated with independent suspension systems while maintaining a low floor profile to improve access to the vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
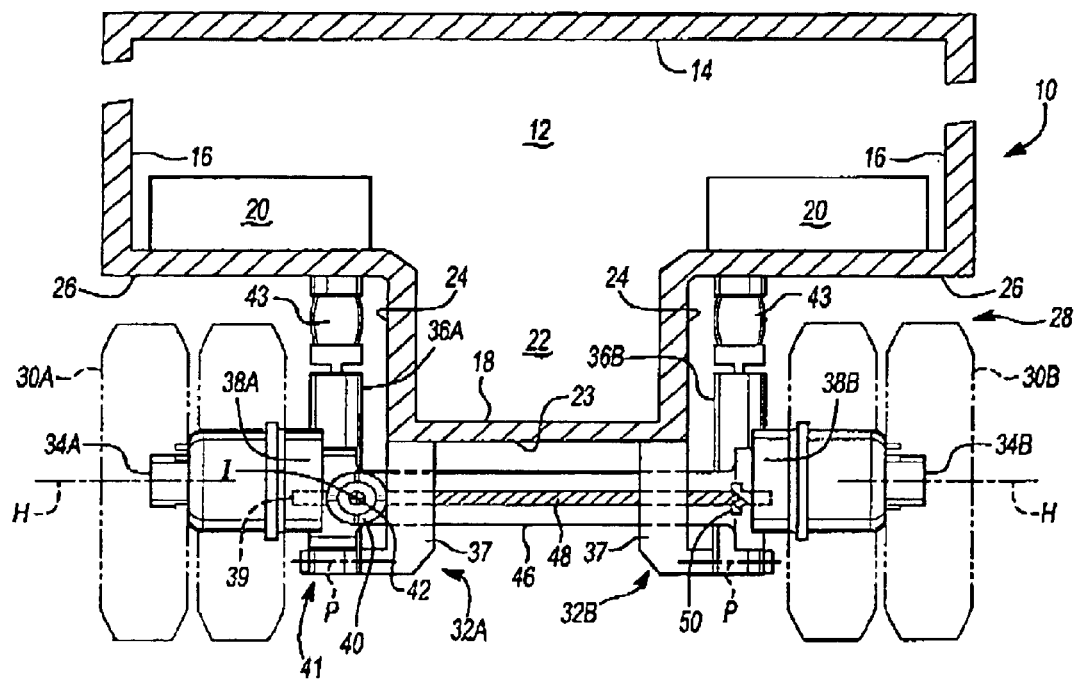
FIG. 1 is an sectional rear view of a suspension system of the subject invention.
Figure 2:
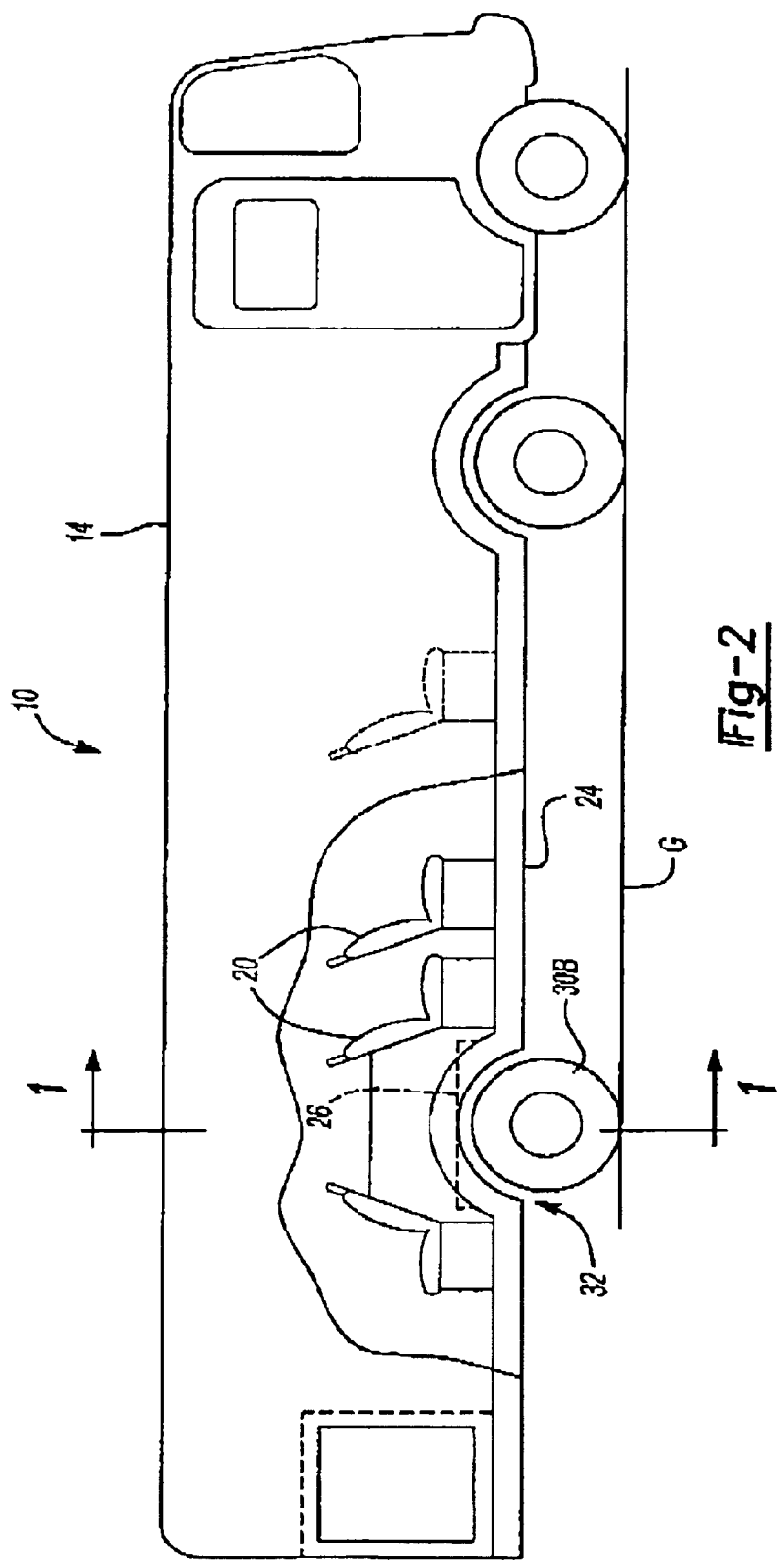
FIG. 2 is a partial cross sectional view of a vehicle incorporating the subject invention.

FIG. 1 schematically illustrates a cross-sectional view of a vehicle 10 which includes a passenger compartment 12 defined by a roof 14, two side walls 16, and a vehicle floor 18. The cross-sectional view is taken transverse to the vehicle length. That is, substantially across the vehicle width (FIG. 2). The vehicle 10 includes a multiple of passenger seats 20 mounted adjacent to each of the side walls 16 with a center aisle 22 extending along the length of the vehicle 10 and between the seats 20. In order to facilitate entering and exiting the vehicle 10, it is desirable to have the vehicle floor 18 and aisle 22 positioned relatively low to the ground.

The floor 18 defined beneath the passenger seats 20 and the aisle 22 preferably defines a first profile segment 23. The second profile segment 24 defines the width of the aisle 22 in the axle zone while the third profile segment 26 defines the top of the wheel box. The profile segments 18, 24, 26 define the underside 28 of the vehicle 10.

A first and second set of vehicle wheels 30A, 30B are each mounted to a swing-arm suspension system 32A, 32B adjacent the vehicle underside 28. It should be understood that vehicle 10 is typically provided with additional axles, driven and/or non-drive axles, and several sets of wheels including multiple pairs of wheels per axle.

Referring to FIG. 2, a hub assembly 34A, 34B supports each respective set of wheels 30A, 30B upon a swing arm 36A, 36B. Each hub assembly 34A, 34B defines a rotational axis H about which the vehicle wheels 30A, 30B are rotated. The hub assemblies 34A, 34B are each attached to an independent swing-arm 36A, 36B which pivots about a pivot axis P. The swing-arm suspension systems 32A, 32B provide semi-independent articulation of each hub assembly 34A, 34B. Preferably, the pivot axis P is located below (closer to the ground) than the rotational axis H. As the pivot point P is low to the ground, an extremely low vehicle floor 18 results.

It should be understood that the rotational axis H is defined herein at a particular static condition. In this static condition, such as when the vehicle 10 is parked or traveling over level terrain, the rotational axis H of both hub assemblies 34A, 34B are substantially aligned along the rotational axis H. It will be appreciated that because of the swing arms, the rotational axis H of the hub assemblies maybe individually displaced from the rotational axis H. In other words, each hub assembly 34A, 34B defines its own rotational axis H when in an articulated condition.

Each swing-arm 36A, 36B is pivotally mounted at one end adjacent the first and second profile segments 23, 24 at a mount 37 which defines the pivot axis P. An opposite end of the swing end is preferably resiliently mounted to the third profile segment 26 though a damper 43 such as a spring, an air spring, airbag or the like. It should be realized that although a particular swing-arm mounting configuration is illustrated in the disclosed embodiment, other mounting arrangements will benefit from the instant invention.

Figure 3:
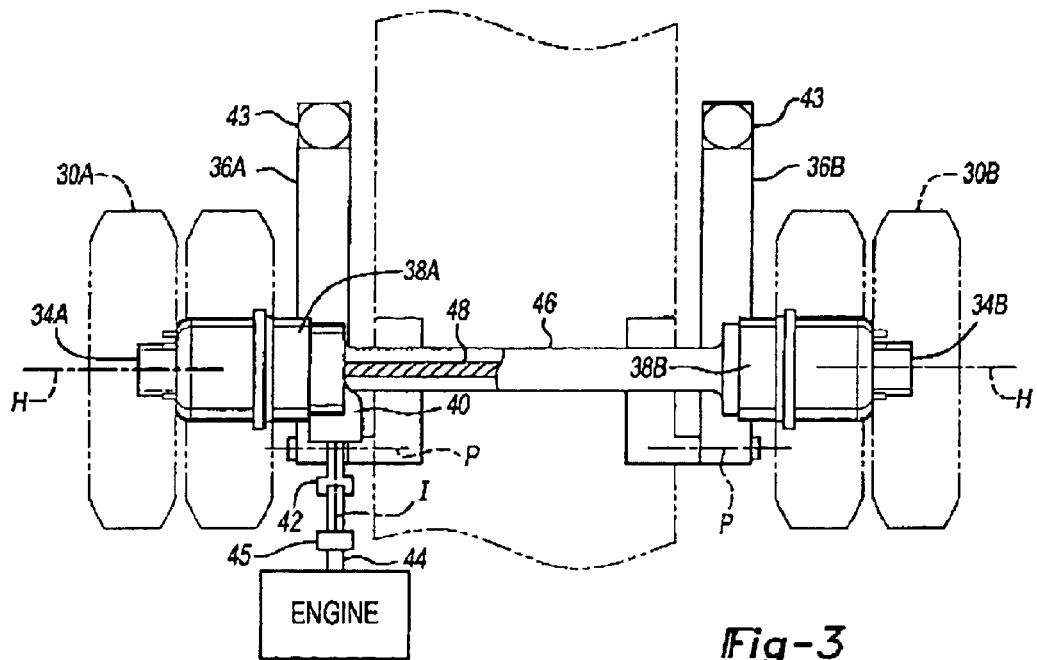
FIG. 3 is an sectional rear view of the suspension system of FIG. 1.

A hub gear box 38A, 38B is operably connected to each hub assembly 34A, 34B to provide torque to drive their respective set of wheels 30A, 30B. An input gearbox 40 drives the hub gear box 38A through a half-shaft 39 or the like. The input gear box 40 and hub gear box 38A are preferably mounted in a common housing 41 (FIGS. 1,3). The input gear box 40A, 40B define an input axis I offset from the rotational axis H. The input axis I is preferably between the rotational axis H and the pivot axis P. The input gear box 40 includes a reduction gear set for reducing a rotational input such as preferably a spiral/bevel gear reduction box. The input gear box 40 alternatively or additionally includes a differential.

The gear boxes include any type of gears known in the art, and can be configured for various reduction gear ratios as is known in the art. Appropriate gear reductions depending upon the drive source is well within the knowledge of one skilled in the art.

Figure 4:
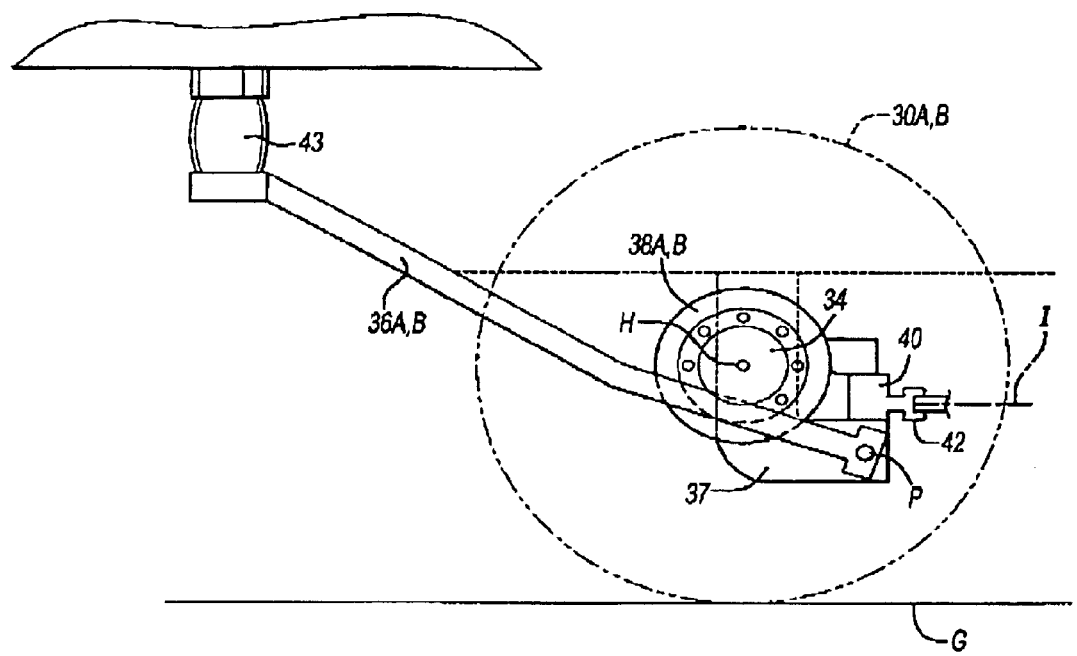
FIG. 4 is a schematic side view illustrating the articulation of the suspension system of the subject invention.

Referring to FIG. 3, a coupling 42 extends from the input gear box 40 to receive an input driveline 44 from a drive source such as vehicle engine (illustrated schematically). The coupling 42 of the input driveline 44 is preferably located proximate the pivot axis P to minimize relative movement during articulation of the swing arm 36. The input driveline 44 includes a jointed connections (illustrated schematically at 45) such as universal joints, slip shafts, constant velocity joints or the like to accommodate the relatively small movement of the input gear box 40. That is, as the pivot axis P is closest to coupling 42 (FIG. 4), motion of the input gear box 40's coupling is less than that of the hub gear box 38A, 38B during articulation. A shallow suspension system is thereby provided which results in further lowering of the vehicle floor without sacrificing ride comfort.

An axle housing 46 extends between the input gear box 40 and hub gear box 38B. The axle housing 46 supports a drive shaft 48 to transmit power from the input gear box 40 to the opposite hub gear box 38B. That is, input gear box 40 receives power from the drive source and distributes it to the hub gear box 38A to drive the first hub assembly 34A. The input gear box 40 further distributes the power to the opposite hub gear box 38B through the driveshaft 48. The hub gear box 38B drives the hub assembly 34B.

Preferably, the axle housing 46 closely supports the drive shaft 48 to protect the rotating drive shaft 48 while providing torsional stiffness between the suspension systems 32A, 32B. Independent structural members between the wheel hub assemblies are thereby minimized.

The axle housing 46 further serves as a torsion bar between the suspension systems 32A, 32B. The drive shaft 48 accommodates the semi-independent motion between the suspension systems 32A, 32B through jointed connections (illustrated schematically at 50) such as universal joints, slip shafts, constant velocity joints or the like.

The foregoing description is exemplary rather than defined by the limitations within. Many modifications and variations of the present invention are possible in light of the above teachings. The preferred embodiments of this invention have been disclosed however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension system for a vehicle comprising:
   a first and a second hub assembly, said first and second hub assembly defining a first axis, said first axis substantially transverse to a vehicle longitudinal axis;
   a first and second swing arm independently supporting each of said first and second hub assemblies, each swing arm defining a pivot axis;
   a first hub gear box operably connected to said first hub assembly for providing torque to drive said first hub assembly;
   a first input gear box operably connected to said first hub sear box for providing torque to drive said first hub gear box, said first input gear box defining a second axis offset from said first axis;
   a second hub gear box operably connected to said second hub assembly for providing torque to drive said second hub assembly; and
   an axle housing between said first input gear box and said second hub gear box.

2. A suspension system as recited in claim 1 further including a drive shaft interconnecting said first input gear box and said second hub gear box.

3. A suspension system as recited in claim 2 further comprising a jointed connection between said drive shaft and said first input gear box and said second hub gear box.

4. A suspension system as recited in claim 1 wherein said axle housing is above said pivot axis relative to the ground.

5. A vehicle independent suspension system as recited in claim 1 wherein said first input gear box and said first hub gear box are mounted within a common housing.

6. A vehicle independent suspension system as recited in claim 1 further comprising a coupling to receive an input driveline.

7. A suspension system as recited in claim 1 wherein said pivot axis is below said first axis and an input axis relative to the ground.

8. A suspension system for a vehicle comprising:
   a first and a second hub assembly, said first and second hub assembly defining a first axis, said first axis substantially transverse to a vehicle longitudinal axis;
   a first and second swing arm independently supporting each of said first and second hub assemblies, each swing arm defining a pivot axis at one end, said pivot axis attached adjacent a second vehicle floor profile segment, said second vehicle floor profile segment adjacent a first vehicle floor profile segment;
   a damper element attached adjacent an opposite end of each swing arm, said damper attached to a third vehicle floor profile segment;
   a first hub gear box operably connected to said first hub assembly for providing torque to drive said first hub assembly;
   a first input gear box operably connected to said first hub gear box for providing torque to drive said first hub gear box, said first input gear box defining a second axis offset from said first axis;
   a second hub gear box operably connected to said second hub assembly for providing torque to drive said second hub assembly; and
   an axle housing between said first input gear box and said second hub gear box.

9. A suspension system as recited in claim 8 wherein said axle housing is above said pivot axis relative to the ground.

10. A vehicle independent suspension system as recited in claim 8 wherein said first input gear box and said first hub gear box are mounted within a common housing.

11. A suspension system as recited in claim 8 wherein said pivot axis is below said first axis and an input axis relative to the ground.

* * * * *

UNITED STATES PATENT AND TRADEMARK OFFICE
CERTIFICATE OF CORRECTION

PATENT NO. : 6,793,035 B2
DATED : September 21, 2004
INVENTOR(S) : Bennett et al.

It is certified that error appears in the above-identified patent and that said Letters Patent is hereby corrected as shown below:

Column 4,
Line 19, "sear" should read as -- gear --.

Signed and Sealed this

Twenty-first Day of December, 2004

JON W. DUDAS
*Director of the United States Patent and Trademark Office*